(12) United States Patent
Youssef et al.

(10) Patent No.: US 11,822,781 B2
(45) Date of Patent: Nov. 21, 2023

(54) DEVICE AND METHOD FOR SECURE IDENTIFICATION OF A USER

(71) Applicant: WORLDLINE, Brussels (BE)

(72) Inventors: Mohamed Amine Youssef, Lincent (BE); Pierrot Baessens, Sint-Pieters-Leeuw (BE)

(73) Assignee: INGENICO BELGIUM, Brussels (BE)

( * ) Notice: Subject to any disclaimer, the term of this patent is extended or adjusted under 35 U.S.C. 154(b) by 550 days.

(21) Appl. No.: 17/056,628

(22) PCT Filed: Jun. 3, 2019

(86) PCT No.: PCT/EP2019/064300
§ 371 (c)(1),
(2) Date: Nov. 18, 2020

(87) PCT Pub. No.: WO2019/233931
PCT Pub. Date: Dec. 12, 2019

(65) Prior Publication Data
US 2021/0209599 A1    Jul. 8, 2021

(30) Foreign Application Priority Data

Jun. 4, 2018  (BE) .................................. 2018/5367

(51) Int. Cl.
*G06F 3/04883*    (2022.01)
*G06F 1/16*    (2006.01)
(Continued)

(52) U.S. Cl.
CPC ........ *G06F 3/04883* (2013.01); *G06F 1/1684* (2013.01); *G06K 7/00* (2013.01);
(Continued)

(58) Field of Classification Search
CPC ........... G06Q 20/4012; G06Q 20/3272; G06Q 20/3823; G06Q 20/3829; G06F 1/1684;
(Continued)

(56) References Cited

U.S. PATENT DOCUMENTS

| 6,061,666 A | 5/2000 | Do et al. |
| 8,251,286 B2 | 8/2012 | Hart et al. |

(Continued)

OTHER PUBLICATIONS

International Search Report from corresponding International Application No. PCT/EP2019/064300, dated Aug. 14, 2019, pp. 1-3, European Patent Office, Rijswijk, The Netherlands.

*Primary Examiner* — Premal R Patel
(74) *Attorney, Agent, or Firm* — HAUPTMAN HAM, LLP (57) ABSTRACT

A portable payment or retail terminal with jack connector and a method for secure identification of a cardholder, the terminal including a set of devices and arrangement for implementing the method, which has at least: detecting the presence of a jack plugged in the connector of the terminal for connecting a cardholder's headset, triggering the execution of an accessibility mode allowing the cardholder to identify, the method being wherein it includes at least: scrambling and maintaining the screen in black during the sequence of the accessibility mode, generating a chain of keys comprising a set of keys for PIN/SNL entry, attributing a value of key corresponding to the length d of the finger's displacement; selecting among pre-registered audio signals corresponding to each key of the chain of keys, the sound corresponding to the key attributed to the displacement and emit it through the jack connector towards the cardholder's headset.

17 Claims, 4 Drawing Sheets

(51) Int. Cl.
  *G06Q 20/32* (2012.01)
  *G06Q 20/38* (2012.01)
  *G06Q 20/40* (2012.01)
  *G09B 21/00* (2006.01)
  *G06K 7/00* (2006.01)

(52) U.S. Cl.
  CPC ..... *G06Q 20/3272* (2013.01); *G06Q 20/3823* (2013.01); *G06Q 20/3829* (2013.01); *G06Q 20/4012* (2013.01); *G09B 21/006* (2013.01)

(58) Field of Classification Search
  CPC ....... G06F 3/04883; G06F 21/31; G06K 7/00; G09B 21/006; G07F 7/1041; G07F 7/0886
  See application file for complete search history.

(56) References Cited

U.S. PATENT DOCUMENTS

| | | | |
|---|---|---|---|
| 2017/0140355 A1* | 5/2017 | Hunting | G07F 9/023 |
| 2017/0269828 A1 | 9/2017 | Görlich et al. | |
| 2018/0095588 A1* | 4/2018 | Klein | H04L 9/3231 |

* cited by examiner

DEVICE AND METHOD FOR SECURE IDENTIFICATION OF A USER

RELATED APPLICATIONS

The present application is a National Phase of International Application Number PCT/EP2019/064300, filed Jun. 3, 2019, and claims priority to Belgium Application No. BE2018/5367, filed Jun. 4, 2018.

FIELD OF INVENTION

The present invention relates to the field of authentication and/or control of the identity of a user who requests a service or who performs a transaction, more precisely the invention concerns a device and method for identifying a person and, which also supports visually impaired persons.

BACKGROUND OF THE INVENTION

The purpose of the invention is to increase security when a user enter an identification code such as for instance a PIN code on a touch screen.

Generally, the screen displays a personal identification keyboard (PIN pad) with a numerical or the like for each key and the user selects each keys corresponding to each value of each digit of the PIN code.

During this operation, any third party may observe and memorize up to 12 digits (generally 4 or 6 digits) of the PIN code, which then allows a fraudulent third party to combine this information with other information to make a fraudulent withdrawal on the account.

An example of the drawback of this solution is represented by EP 2 791 845.

Until now, terminals manufacturers were providing the displayed part with a protection against the possibility to observe the key values. This solution is not fully efficient and present the drawback of increasing the volume of the terminal.

Another attempt to solve this problem was, according U.S. Pat. No. 8,392,846, to display a virtual PIN pad in varying locations on a touch screen in order to prevent fraud or interception of personal identification. However, a camera could still observe each step and by reviewing the images a fraudulent third party could access to the information. The solution of the present invention is able to prevent such drawback.

SUMMARY OF THE INVENTION

The present invention has as its object to obviate certain drawback of the prior art by offering a means for secure authentication or control of identity of people including visually impaired persons.

This goal is achieved by a portable payment or retail terminal with a jack connector for secure identification of a cardholder, said terminal comprising at least:
- a first memory for storing a sequence of instructions representing an accessibility mode and to be executed by the terminal;
- an authentication arrangement for implementing an authentication process for cardholders by entering a PIN code or a sequence of numbers and letters (SNL);
- a first detection device for detecting the presence in the connector of a jack plugged in for connecting a cardholder's headset and comprising an arrangement for producing an electric signal for triggering the execution of the accessibility mode;
- a second detection device to detect by means of the position of the finger on the screen each time a finger of the headset owner touches the screen;

wherein:
- the terminal comprises an arrangement connected to the authentication arrangement for scrambling and maintaining the screen in black during all the sequence of the accessibility mode;
- the authentication arrangement comprises a program to generate at least a set of chain of keys memorized in a "chain file" of the terminal (1), for PIN/SNL entry, each chain of keys comprising a set of keys (20), said keys (20) being randomly distributed within said chain of keys;
- the second detection device comprises an arrangement to detect the length, d, of the finger's displacement on the screen and is connected to the authentication arrangement so as to transmit a signal corresponding to the length d to indicate that a displacement occurs or not depending on the value of said length d compared to a memorized threshold value;
- the authentication arrangement comprises a sorting module to retrieve, when receiving a signal indicating a displacement, in the memorized chain file a chain of keys so as to attribute a value of key corresponding to the length d of the finger's displacement, and is connected to an audio arrangement (17) of the terminal (1) where pre-registered audio signals corresponding to each key of the chain of keys are stored, so as to select the sound corresponding to the key attributed to the displacement and emit it through the jack connector towards the cardholder's headset;
- the terminal comprises a program to reiterate these actions until the user listening the value of a digit or character of a PIN/SNL remove its finger from the screen, the last value, indicated as feedback, is then stored in second memory, included in the terminal, as a digit of the PIN/SNL.

According to another feature, the portable payment comprises a controller including at least:
- the second detection device which is connected to the screen of the terminal so as to capture and register, in a third memory, the data related to the positions of the finger when said screen is touched;
- a position generator device, comprising an arrangement to generate data corresponding to various positions on the screen, said various positions being registered in a fourth memory;
- a processor and a fifth memory comprising a set of programs executed on said processor so as to avoid the touch screen to display a chain of keys with the keys positions determined by the data generated by the position generator device;

the set of programs of the fifth memory of said controller comprising at least:
- a comparison algorithm to compare the data corresponding to the touched region, registered in the third memory, with the data representative of each location of the screen generated by the position generator device and registered in the fourth memory;
- an audio algorithm to produce in a headset connected to the jack an audible signal corresponding to the value of the key;

a first iteration algorithm to reiterate the comparison algorithm and audio algorithm until the user listening the value he expects removes the finger from the screen, such action triggering on the memory the memorization of said value as a first digit;

a second iteration algorithm to further reiterate the first iteration algorithm each time the authentication arrangement receives a new touch detection signal and as long as the number of digit value memorized is lower than the maximum value of digit numbers contained by PIN code or identifying code.

According to another feature, the first detection device is connected to the processor of the controller so as to transmit the electrical signal for triggering the accessibility mode.

According to another feature, the processor of the controller is connected to the first memory for downloading and executing the sequence of instructions representing the accessibility mode when receiving the said electrical signal.

According to another feature, the processor of the controller is connected to the authentication arrangement so as to transmit to it an activation signal when the accessibility mode is on, the authentication arrangement generating the chain of keys for identification of the cardholder after receiving said activation signal.

According to another feature, the controller transmits a set of data, comprising at least the position values generated by the position generator device, to the authentication arrangement, said authentication arrangement generating the chain of keys on a location of the screen base on said set of data.

According to another feature, the second detection device comprises an arrangement to measure the displacement of the finger on the screen from a given initial position, the length of the displacement being characterized by the value d, said length d being compared to a threshold value memorized in said second detection device and, if the length d is greater than the threshold value, a signal is transmitted to the authentication arrangement to indicate that there is a displacement of the finger, if on the contrary, the length d is less than the threshold value, the second detection device considers that no displacement of the finger occurs a signal is transmitted to the authentication arrangement indicating that there is no displacement of the finger.

According to another feature, the authentication arrangement is connected to the second detection device so as to retrieve a chain of keys in the chain file when said second detection device detects the finger on the screen.

According to another feature, when said second detection device detects a displacement of the finger on the screen said authentication arrangement attributes to the position of the finger a value of a key of the chain of keys.

According to another feature, the authentication arrangement comprises a key designation module which generates a key list comprising information on each key of the chain of keys and related position, said key list being reused by said authentication arrangement if the user moving his finger in a given direction goes back to a previous position or another direction so as to correct or change a choice of key.

According to another feature, the authentication arrangement comprises a program which determines, in real time, from the information contained in the key list, the direction of the finger moving on the screen so as to check if the user moves said finger forward or backward or in any orientation.

According to another feature, it comprises a counter device connected to the authentication arrangement and the second memory of the terminal, said counter device counting the number of digit memorized in the second memory and when said count number matches with a predetermined value registered and representing the number of digits of the PIN/SNL, emitting a signal to said authentication arrangement so as to execute the authentication process.

According to another feature, the first detecting device is an electro-mechanical switch.

According to another feature, the first detecting device is a sensor

Another goal of the present invention is to provide a process for the secure authentication of a user.

This goal is obtained by means of a method for secure identification of a cardholder with a portable payment or retail terminal as described in the present application, said method comprising at least the steps of:

detecting the presence of a jack plugged in the connector of the terminal for connecting a cardholder's headset;

triggering the execution of an accessibility mode allowing the cardholder to identify;

detecting the position of the finger of the cardholder on the screen each time the screen is touched by the cardholder;

wherein the method comprises the steps of:

scrambling and maintaining the screen in black during the sequence of the accessibility mode;

generating a chain of keys comprising a set of keys not to be displayed on positions on the screen of the terminal for PIN/SNL entry;

detecting the length of the finger's displacement on the screen and transmitting a signal corresponding to the length d to indicate that a displacement occurs or not depending on the value of said length d compared to a memorized threshold value;

retrieving, when receiving a signal indicating a displacement, in the memorized chain file a chain of keys so as to attribute a value of key corresponding to the length d of the finger's displacement, and selecting, among pre-registered audio signals corresponding to each key of the chain of keys, the sound corresponding to the key attributed to the displacement and emit said sound through the jack connector towards the cardholder's headset;

reiterating the detection and retrieving steps until the finger is removed from the screen;

storing the last value when removing the finger as a digit of the PIN/SNL.

According to another feature, the method for secure identification also comprises at least the steps of:

generating a set of data corresponding to various positions on the screen;

generating the chain of keys on a location of the screen based on a subset of the set of data of various positions generated.

According to another feature, that the step of detecting the position of the finger on the screen comprises at least capturing and registering the data related to the position of the finger when touching the screen.

BRIEF DESCRIPTION OF THE DRAWINGS

Other features and advantages of the present invention will appear more clearly upon reading the following description, given with reference to the appended drawings, in which.

DETAILED DESCRIPTION

The present invention concerns a portable payment or retail terminal (1) for the secure identification of a user, including a visually impaired user, during a transaction.

Figure 1A:
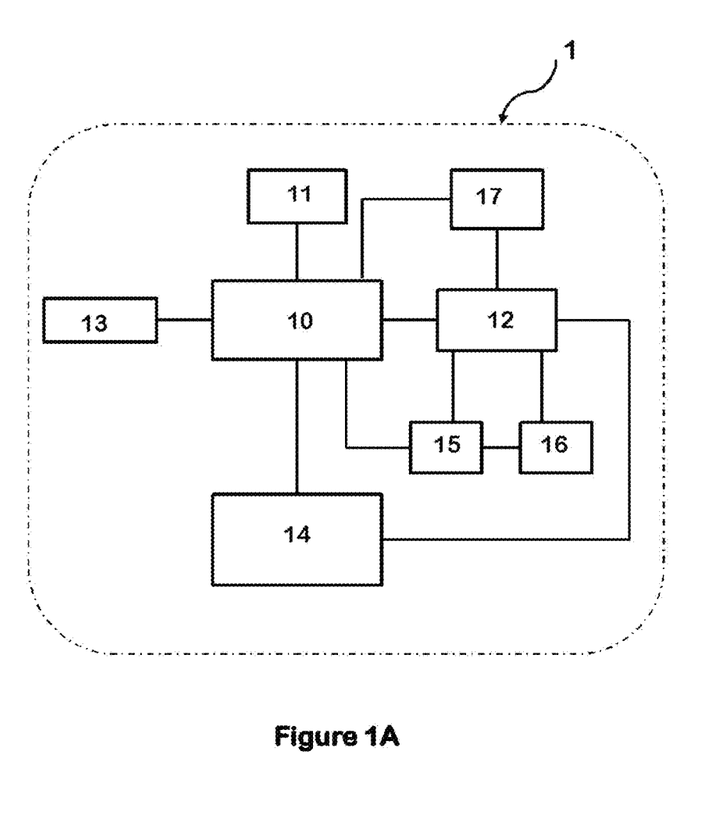
FIG. 1A, 1B are schematic representations respectively of the components of the portable payment or retail terminal and the controller, according one embodiment.
Figure 1B:
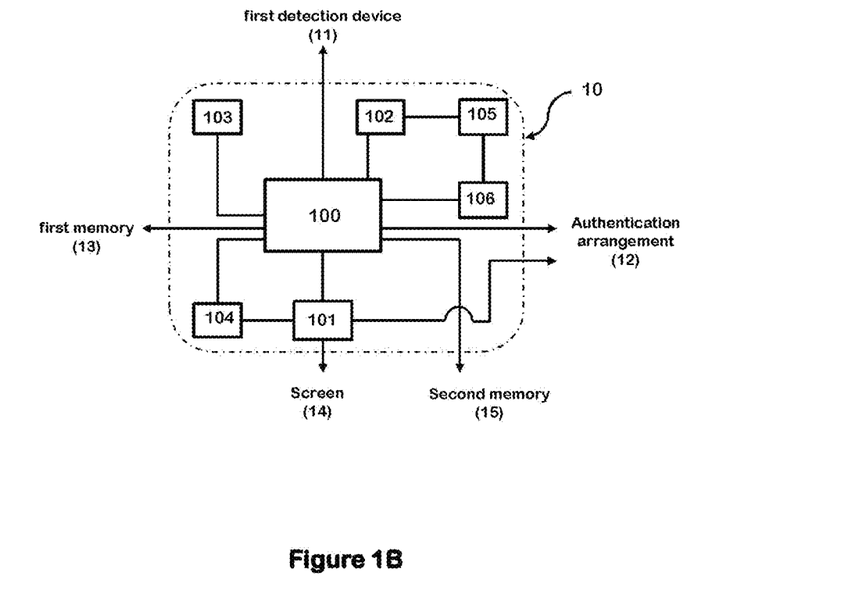
Figure 2A:
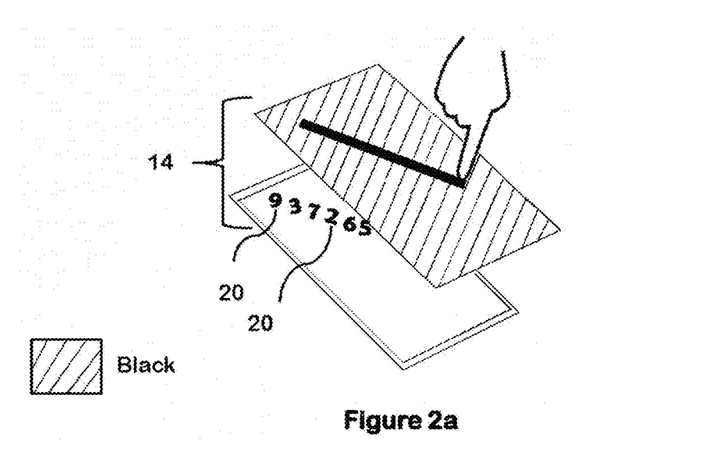
FIG. 2A, 2B are schematic representations of the PIN entry on the scrambled screen in black, according one embodiment.
Figure 2B:
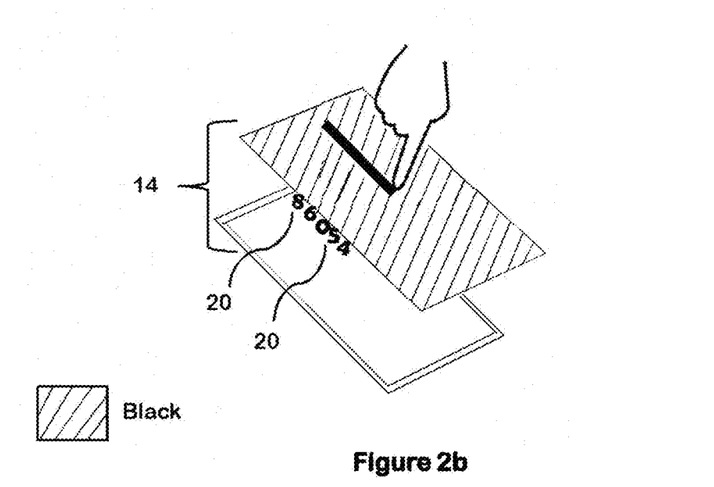

In some embodiments, the portable payment or retail terminal (1, FIG. 1a) with a jack connector for secure identification of a cardholder, said terminal (1) comprising at least:
- a first memory (13) for storing a sequence of instructions representing an accessibility mode and to be executed by the terminal (1);
- an authentication arrangement (12) for implementing authentication process for cardholders by entering a PIN code or a sequence of numbers and letters (SNL);
- a first detection device (11) for detecting the presence in the connector of a jack plugged in for connecting a cardholder's headset and comprising an arrangement for producing an electrical signal for triggering the execution of the accessibility mode;
- a second detection device (101), as illustrated in FIG. 1b, to detect by means of the position of the finger on the screen (14) each time a finger of the headset owner touches the screen (14);

the terminal (1) being characterized in that:
- it comprises an arrangement connected to the authentication arrangement (12) for scrambling and maintaining the screen (14) in black during all the sequence of the accessibility mode;
- the authentication arrangement (12) comprises a program to generate, each time the accessibility mode is on, at least a set of chain of keys memorized in a chain file of the terminal (1), for PIN/SNL entry, each chain of keys comprising a set of keys (20), as shown in FIG. 2a or FIG. 2b, said keys (20) being randomly distributed within said chain of keys;
- the second detection device (101) comprises an arrangement to detect the length, d, or the orientation of the finger's displacement on the screen and is connected to the authentication arrangement (12) so as to transmit a signal corresponding to the length d or the angle of orientation to indicate that a displacement occurs or not depending on the value of said length d or said angle of orientation compared to a memorized threshold value;
- the authentication arrangement comprises a sorting module to retrieve, when receiving a signal indicating a displacement, in the memorized chain file a chain of keys so as to attribute a value of key corresponding to the length d or the angle of orientation the finger's displacement, and is connected to an audio arrangement (17) of the terminal (1) where pre-registered audio signals corresponding to each key of the chain of keys are stored, so as to select the sound corresponding to the key attributed to the displacement and emit it through the jack connector towards the cardholder's headset;
- it comprises a program to reiterate these actions until the user listening to the value of a digit or character of a PIN/SNL removes his finger from the screen (14), the last value, indicated as feedback, is then stored in a second memory (15), included in the terminal (1), as a digit of the PIN/SNL.

By chain of keys, we mean a successive given number of digits or characters.

The chain of keys may comprise at least keys (20) with values from 0 to 9 or letter from A to Z or both. For example, and without limitation, a chain generated may be "3241569807".

Each time the user touches the screen after a choice of a digit of his PIN/SNL, the terminal retrieves a new chain of keys from the chain file.

Once a value of key (20) is chosen by the user, a double tap gesture of the finger allows to validate said choice.

It is thus obvious that the terminal describes in the present application provides a secure way to validate a transaction, since there is no key or keypad displayed on the screen (14).

In addition, since the screen is maintained in black and that the user need only to displaced his finger on the screen to select a key (20) or digit, the terminal may be used for both normal and visually impaired users.

By transaction, we mean the payment of a product or service, for example.

In some embodiments, the second detection device (101) comprises an arrangement to measure the displacement or movement of the finger on the screen from a given initial position or orientation, the length of the displacement or movement being characterized by the value d or angle of orientation. The length d or the angle of orientation is compared to a threshold value memorized in said second detection device (101). If the length d or the angle of orientation is greater than the threshold value, a signal is transmitted to the authentication arrangement to indicate that there is a displacement of the finger. If on the contrary, the length d or the angle of orientation is less than the threshold value, the second detection device (101) considers that no displacement of the finger occurs a signal is transmitted to the authentication arrangement indicating that there is no displacement of the finger.

In some embodiments, the portable payment or retail terminal (1) comprises a controller (10), as illustrated in FIG. 1b, including at least:
- the second detection device (101) which is connected to the screen (14) of the terminal (1) so as to capture and register, in a third memory (104), the data related to the positions of the finger when said screen (14) is touched;
- a position generator device (102), comprising an arrangement to generate data corresponding to various positions on the screen (14), said various positions being registered in a fourth memory (105);
- a processor (100) and a fifth memory (103) comprising a set of programs executed on said processor (100) so as to avoid the touch screen (14) to display a chain of keys with the keys (20) positions determined by the data generated by the position generator device (102);

the set of programs of the fifth memory of said controller (10) comprising at least:
- a comparison algorithm to compare the data corresponding to the touched region, registered in the third memory, with the data representative of each location of the screen generated by the position generator device and registered in the fourth memory;
- an audio algorithm to produce in a headset connected to the jack an audible signal corresponding to the value of the key (20);
- a first iteration algorithm to reiterate the comparison algorithm and audio algorithm until the user listening the value he expects remove the finger from the screen (14), such action triggering on the memory the memorization of said value as a first digit;

a second iteration algorithm to further reiterate the first iteration algorithm each time the authentication arrangement receives a new touch detection signal and as long as the number of digit value memorized is lower than the maximum value of digit numbers contained by PIN code or identifying code.

In some embodiments, the first detection device (11) is connected to the controller (10) so as to transmit the electrical signal for triggering the accessibility mode.

In some embodiments, the processor of the controller is connected to the first memory for downloading and executing the sequence of instructions representing the accessibility mode when receiving the said electrical signal.

In some embodiments, the controller (10) is connected to the authentication arrangement (12) so as to transmit to it an activation signal when the accessibility mode is on, the authentication arrangement (12) generating the chains of keys for identification of the cardholder after receiving said activation signal.

In some embodiments, the controller (10) transmits a set of data, comprising at least the position values generated by the position generator device (102), to the authentication arrangement (12), said authentication arrangement (12) generating the chain of keys on a location of the screen (14) base on said set of data.

In some embodiments, the authentication arrangement is connected to the second detection device so as to retrieve a chain of keys in the chain file when said second detection device (101) detects the finger on the screen. When the second detection device detects a displacement or movement of the finger on the screen said authentication arrangement attributes to the position of the finger a value of a key (20) of the chain of keys. For example and without limitation, when the first displacement or movement of the finger is detected on the screen, the authentication arrangement attributes the value of the first key (20) of the chain of keys, for example "2", to the position of the finger and a pre-registered sound or audio signal corresponding to the key "2" is retrieve and from the audio arrangement and emitted through the headset of the user indicating the value of the key (20). When the second detection device detects a second displacement of movement of the finger, from the last position, the authentication arrangement attributes the value of the second key (20) of the chain of keys, for example "7", to the position of the finger and a pre-registered sound or audio signal corresponding to the key "7" is retrieve and from the audio arrangement and is emitted through the headset of the user indicating the value of the key (20), and so on until the user chooses and validates a given value.

In some embodiments, the authentication arrangement comprises a key designation module (106) which generates a key list comprising information on each key (20) of the chain of keys and related position, said key list being reused by said authentication arrangement if the user moving his finger in a given direction or orientation goes back to a previous position or another direction so as to correct or change a choice of key (20).

In some embodiments, the authentication arrangement comprises a program which determines, in real time, from the information contained in the key list, the direction of the finger moving on the screen so as to check if the user moves said finger forward or backward or in any orientation.

In some embodiments, the portable payment or retail terminal (1) comprises a counter (16) device connected to the authentication arrangement (12) and the second memory (15) of the terminal (1), said counter (16) device counting the number of digit memorized in the second memory (15) and when said count number matches with a predetermined value registered and representing the number of digits of the PIN/SNL, emitting a signal to said authentication arrangement (12) so as to execute the authentication process.

In some embodiments, the first detecting device is an electro-mechanical switch.

In some embodiments, the first detecting device is a sensor.

The present invention also concerns a method for identification of a visually impaired user in a device comprising a terminal (1) as described above (in the present application).

Figure 3:
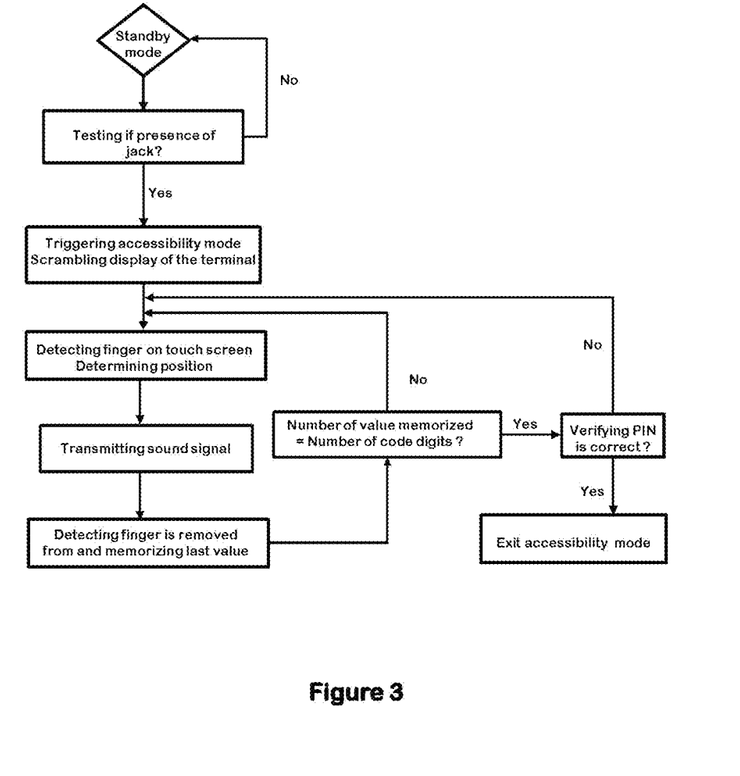
FIG. 3 is a schematic representation of some steps of the method for secure identification of a user by means of the portable payment or retail terminal.

In some embodiments, the method for secure identification of a cardholder with a portable payment or retail terminal (1) as described above, comprises at least the steps of (FIG. 3):

detecting the presence of a jack plugged in the connector of the terminal (1) for connecting a cardholder's headset;

triggering the execution of an accessibility mode allowing the cardholder to identify;

detecting the position of the finger of the cardholder on the screen (14) each time the screen (14) is touched by the cardholder the method being characterized in that it comprises the steps of:

scrambling and maintaining the screen in black during the sequence of the accessibility mode;

generating a chain of keys comprising a set of keys (20) not to be displayed on positions on the screen (14) of the terminal (1) for PIN/SNL entry;

detecting the length or orientation of the finger's displacement on the screen and transmitting a signal corresponding to the length d or the angle of orientation to indicate that a displacement occurs or not depending on the value of said length d or angle of orientation compared to a memorized threshold value;

retrieving, when receiving a signal indicating a displacement, in the memorized chain file a chain of keys so as to attribute a value of key corresponding to the length d or the angle of orientation of the finger's displacement, and selecting, among pre-registered audio signals corresponding to each key of the chain of keys, the sound corresponding to the key attributed to the displacement and emit it through the jack connector towards the cardholder's headset;

reiterating the detection and retrieving steps until the finger is removed from the screen (14);

storing the last value when removing the finger as a digit of the PIN/SNL.

In some embodiments, the method for secure identification also comprises at least the steps of:

generating a set of data corresponding to various positions on the screen (14);

generating the chain of keys on a location of the screen based on a subset of the set of data of various positions generated.

In some embodiments, the step of detecting the position of the finger on the screen (14) comprises at least capturing and registering the data related to the position of the finger when touching the screen (14).

The present application describes various technical features and advantages with reference to the figures and/or various embodiments. Those skilled in the art will understand that the technical features of a given embodiment can in fact be combined with features of another embodiment unless explicitly stated otherwise, or unless the combination does not provide a solution to at least one of the technical problems mentioned in the present application. In addition, the technical features described in a given embodiment can be isolated from the other technical features of this embodiment unless explicitly stated otherwise.

It must be obvious to those skilled in the art that the present invention allows embodiments in many specific forms without departing from the field of application of the invention as claimed. Consequently, the present embodiments must be considered as illustrations, but can be modified in the area defined by the scope of the appended claims, and the invention must not be limited to the details given above.

The invention claimed is:

1. A portable payment or retail terminal with a jack connector for secure identification of a cardholder, said terminal comprising at least:
   a first memory for storing a sequence of instructions representing an accessibility mode and to be executed by the terminal;
   an authentication arrangement for implementing an authentication process for cardholders by entering a PIN code or a sequence of numbers and letters (SNL);
   a first detection device for detecting the presence in the connector of a jack plugged in for connecting a cardholder's headset and comprising an arrangement for producing an electrical signal for triggering the execution of the accessibility mode;
   a second detection device to detect by means of the position of the finger on the screen each time a finger of the headset owner touches the screen;
   wherein:
   the terminal comprises an arrangement connected to the authentication arrangement for scrambling and maintaining the screen in black during all the sequence of the accessibility mode;
   the authentication arrangement comprises a program to generate at least a set of chain of keys memorized in a chain file of the terminal, for PIN/SNL entry, each chain of keys comprising a set of keys, said keys being randomly distributed within said chain of keys;
   the second detection device comprises an arrangement to detect the length, d, of the finger's displacement on the screen and is connected to the authentication arrangement so as to transmit a signal corresponding to the length d to indicate that a displacement occurs or not depending on the value of said length d compared to a memorized threshold value;
   the authentication arrangement comprises a sorting module to retrieve, when receiving a signal indicating a displacement, in the memorized chain file a chain of keys so as to attribute a value of key corresponding to the length d of the finger's displacement, and is connected to an audio arrangement of the terminal where pre-registered audio signals corresponding to each key of the chain of keys are stored, so as to select the sound corresponding to the key attributed to the displacement and emit said sound through the jack connector towards the cardholder's headset;
   the terminal comprises a program to reiterate these actions until the user listening to the value of a digit or character of a PIN/SNL remove its finger from the screen, the last value, indicated as feedback, is then stored in second memory, included in the terminal, as a digit of the PIN/SNL.

2. A portable payment or retail terminal with jack connector according to claim 1, wherein the portable payment or retail terminal comprises a controller including at least:
   the second detection device which is connected to the screen of the terminal so as to capture and register, in a third memory, the data related to the positions of the finger when said screen is touched;
   a position generator device, comprising an arrangement to generate data corresponding to various positions on the screen, said various positions being registered in a fourth memory;
   a processor and a fifth memory comprising a set of programs executed on said processor so as to avoid the touch screen to display a chain of keys with the keys positions determined by the data generated by the position generator device;
   the set of programs of the fifth memory of said controller comprising at least:
   a comparison algorithm to compare the data corresponding to the touched region, registered in the third memory, with the data representative of each location of the screen generated by the position generator device and registered in the fourth memory;
   an audio algorithm to produce in a headset connected to the jack an audible signal corresponding to the value of the key;
   a first iteration algorithm to reiterate the comparison algorithm and audio algorithm until the user listening the value he expects remove the finger from the screen, such action triggering on the memory the memorization of said value as a first digit;
   a second iteration algorithm to further reiterate the first iteration algorithm each time the authentication arrangement receives a new touch detection signal and as long as the number of digit value memorized is lower than the maximum value of digit numbers contained by PIN code or identifying code.

3. A portable payment or retail terminal according to claims 1, wherein the first detection device is connected to the processor of the controller so as to transmit the electrical signal for triggering the accessibility mode.

4. A portable payment or retail terminal according to claim 1, wherein the processor of the controller is connected to the first memory for downloading and executing the sequence of instructions representing the accessibility mode when receiving the said electrical signal.

5. A portable payment or retail terminal according to claim 1, wherein the processor of the controller is connected to the authentication arrangement so as to transmit to it an activation signal when the accessibility mode is on, the authentication arrangement generating the chain of keys for identification of the cardholder after receiving said activation signal.

6. A portable payment or retail terminal according to claim 1, wherein the controller transmits a set of data, comprising at least the position values generated by the position generator device, to the authentication arrangement, said authentication arrangement generating the chain of keys on a location of the screen base on said set of data.

7. A portable payment or retail terminal according to claim 1, wherein the second detection device comprises an arrangement to measure the displacement of the finger on the screen from a given initial position, the length of the displacement being characterized by the value d, said length d being compared to a threshold value memorized in said second detection device and, if the length d is superior to the threshold value, a signal is transmitted to the authentication arrangement to indicate that there is a displacement of the finger, if on the contrary, the length d is inferior to the threshold value, the second detection device considers that no displacement of the finger occurs a signal is transmitted to the authentication arrangement indicating that there is no displacement of the finger.

8. A portable payment or retail terminal according to claim 1, wherein the authentication arrangement is connected to the second detection device so as to retrieve a chain of keys in the chain file when said second detection device detects the finger on the screen.

9. A portable payment or retail terminal according to claim 7, wherein when said second detection device detects a displacement of the finger on the screen said authentication arrangement attributes to the position of the finger a value of a key of the chain of keys.

10. A portable payment or retail terminal according to claim 1, wherein the authentication arrangement comprises a key designation module which generates a key list comprising information on each key of the chain of keys and related position, said key list being reused by said authentication arrangement if the user moving his finger in a given direction goes back to a previous position or another direction so as to correct or change a choice of key.

11. A portable payment or retail terminal according to claim 10, wherein the authentication arrangement comprises a program which determines, in real time, from the information contained in the key list, the direction of the finger moving on the screen so as to check if the user moves said finger forward or backward or in any orientation.

12. A portable payment or retail terminal according to claim 1, wherein the portable payment or retail terminal comprises a counter device connected to the authentication arrangement and the second memory of the terminal, said counter device counting the number of digit memorized in the second memory and when said count number matches with a predetermined value registered and representing the number of digits of the PIN/SNL, emitting a signal to said authentication arrangement so as to execute the authentication process.

13. A portable payment or retail terminal according to claim 1, wherein the first detecting device is an electromechanical switch.

14. A portable payment or retail terminal according to claim 1, wherein the first detecting device is a sensor.

15. A method for secure identification of a cardholder with a portable payment or retail terminal according to claim 1, said method comprising at least the steps of:
   detecting the presence of a jack plugged in the connector of the terminal for connecting a cardholder's headset;
   triggering the execution of an accessibility mode allowing the cardholder to identify;
   detecting the position of the finger of the cardholder on the screen each time the screen is touched by the cardholder
wherein the method includes the steps of:
   scrambling and maintaining the screen in black during the sequence of the accessibility mode;
   generating a chain of keys comprising a set of keys not to be displayed on positions on the screen of the terminal for PIN/SNL entry;
   detecting the length of the finger's displacement on the screen and transmitting a signal corresponding to the length d to indicate that a displacement occurs or not depending on the value of said length d compared to a memorized threshold value;
   retrieving, when receiving a signal indicating a displacement, in the memorized chain file a chain of keys so as to attribute a value of key corresponding to the length d of the finger's displacement, and selecting, among pre-registered audio signals corresponding to each key of the chain of keys, the sound corresponding to the key attributed to the displacement and emit it through the jack connector towards the cardholder's headset;
   reiterating the detection and retrieving steps until the finger is removed from the screen;
   storing the last value when removing the finger as a digit of the PIN/SNL.

16. A method for secure identification of a cardholder according to claim 15, wherein the method also comprises at least the steps of:
   generating a set of data corresponding to various positions on the screen;
   generating the chain of keys on a location of the screen based on a subset of the generated set of data of various positions.

17. A method for secure identification of a cardholder according to claim 15, wherein the step of detecting the position of the finger on the screen comprises at least capturing and registering the data related to the position of the finger when touching the screen.

* * * * *